United States Patent [19]

Fermaglich et al.

[11] 4,174,895
[45] Nov. 20, 1979

[54] APPARATUS FOR PRODUCING MULTIPLE IMAGE FORMATS

[76] Inventors: Saul Fermaglich, 130 Overlook Ave., Hackensack, N.J. 07601; Ivan Volent, 1600 Center Ave., Fort Lee, N.J. 07024

[21] Appl. No.: 879,152

[22] Filed: Feb. 21, 1978

[51] Int. Cl.² .......................... G03B 5/02; G03B 29/00
[52] U.S. Cl. ........................................ 354/76; 354/123
[58] Field of Search ............... 354/118, 120, 123, 124, 354/197, 76; 355/46, 54

[56] References Cited

U.S. PATENT DOCUMENTS

| | | | |
|---|---|---|---|
| 424,146 | 3/1890 | Tapley | 354/123 |
| 3,283,685 | 11/1966 | Cummins | 354/118 |
| 3,951,545 | 4/1976 | Lucht | 355/46 |
| 4,027,315 | 5/1977 | Barney | 354/123 X |

*Primary Examiner*—John Gonzales
*Attorney, Agent, or Firm*—Bauer & Amer

[57] ABSTRACT

An apparatus of generally known classification which produces photographic records of multiple images in various display formats, i.e. a four-frame, six-frame, or other such multiple frame format arrangement of the images, wherein positional movements in the lens assembly typically used to project the image onto the film sheet is relied on to correspondingly position the image on said film sheet is herein significantly changed and, instead, the projected image is positioned by selection of an appropriately pre-positioned lens. Thus, instead of using one universally movable lens, a multiple of differently strategically positioned lenses are operationally available and are separately selected for operation based on position to correspondingly provide an appropriately positioned image on the photographic record or film sheet.

5 Claims, 8 Drawing Figures

U.S. Patent  Nov. 20, 1979  Sheet 1 of 2  4,174,895
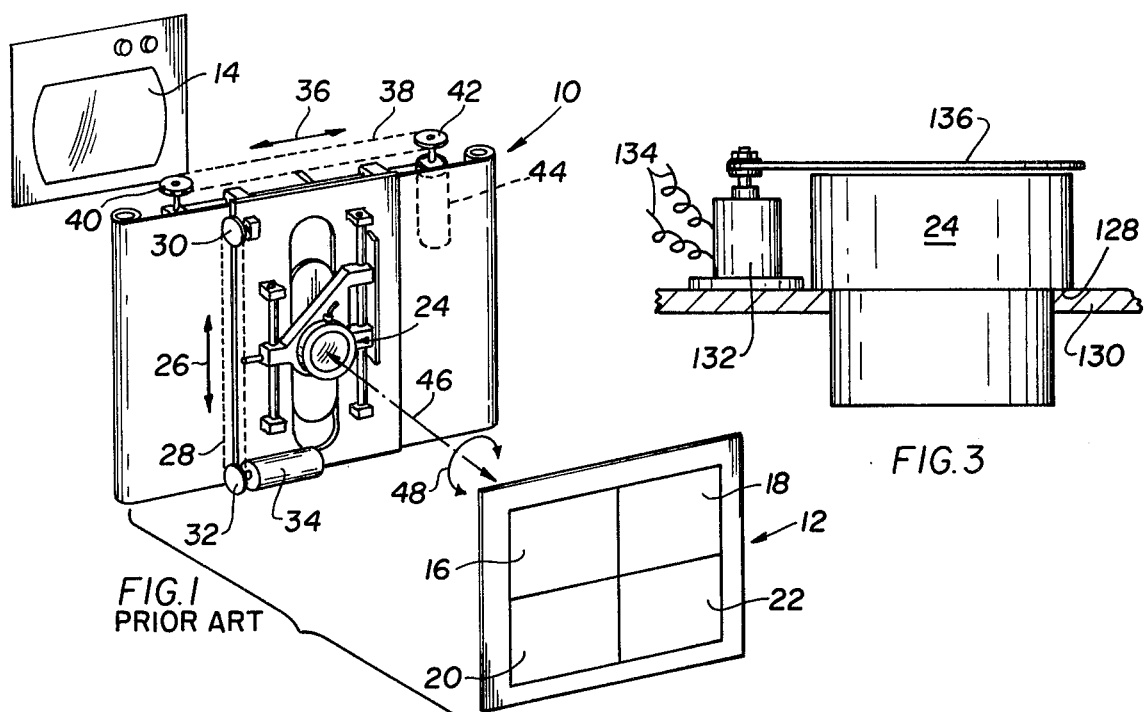
FIG. 3
FIG. 1 PRIOR ART
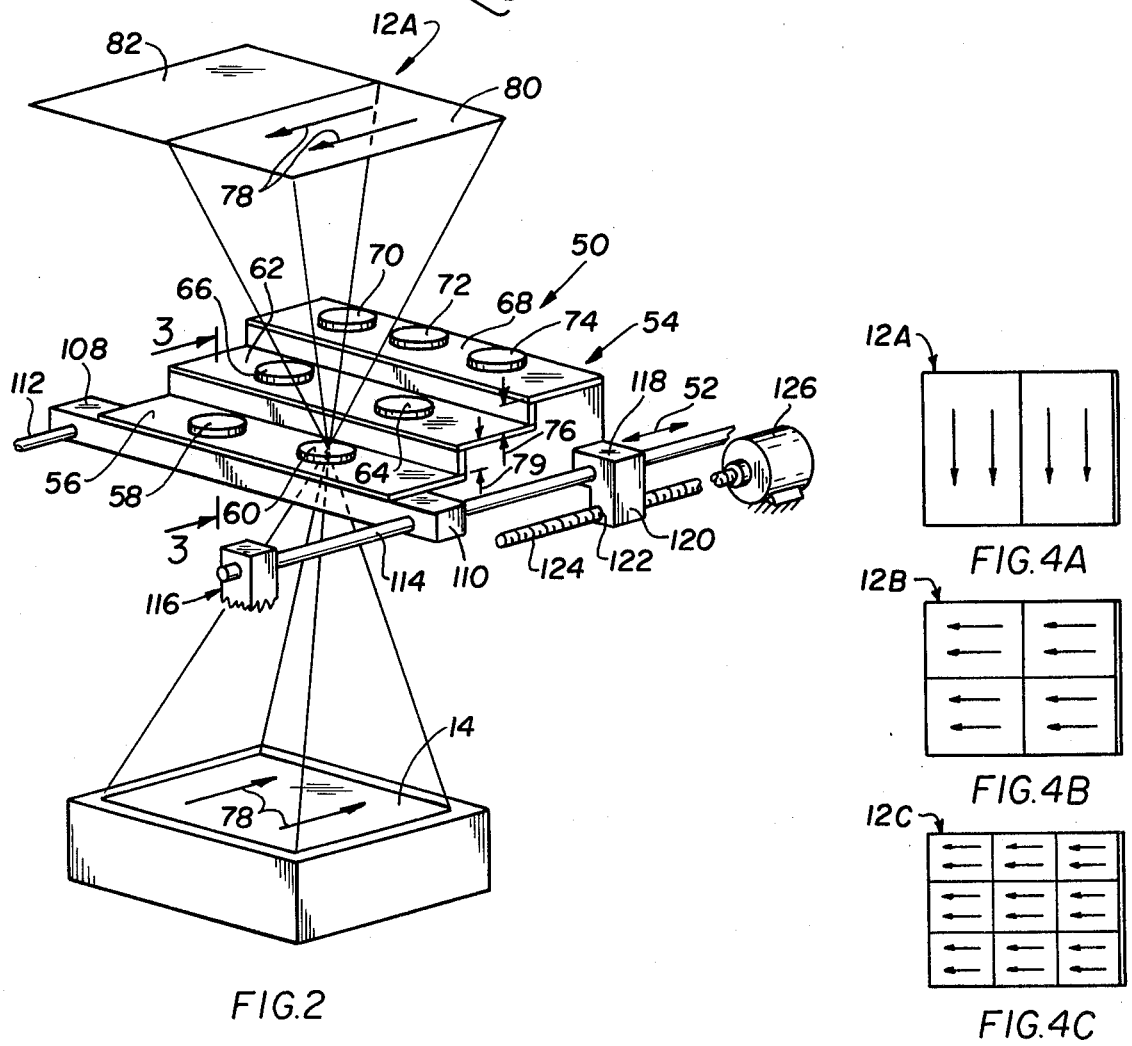
FIG. 2
FIG. 4A
FIG. 4B
FIG. 4C

APPARATUS FOR PRODUCING MULTIPLE IMAGE FORMATS

The present invention relates generally to apparatus for producing photographic reproductions of image-type subject matter in a variety of formats, e.g. four such images in two rows of two each, six images in two rows of three each, and so on, and more particularly to an improved apparatus of this type in which the photographic records are effectively produced in any selected format with an optimum nominal amount of movement in the movable parts or components thereof, thereby greatly simplifying the construction and operational requirements of the apparatus, as well as contributing to other benefits and advantages.

As generally known and exemplified by the multiple image-recording camera of U.S. Pat. No. 4,027,315, by providing movement to the image-transferring or projecting lens thereof (the transfer being of the image as displayed on a video screen to the film sheet in a remote location therefrom), at least along perpendicular axes X and Y, it is possible to impart the required position to the projected image on the film sheet. Moreover, since a variety of multiple image formats is used, the image-projecting lens in the aforesaid patented, as well as in other similar cameras, is operationally arranged to partake of extensive movement along the noted two, and possibly additional, movement paths. The construction and operational requirements for the typical lens assembly of known apparatus of the classification noted is thus unavoidably complicated by the degrees of motion thereof, the cooperating controlling electronic circuits or the like for controlling this movement, and such auxiliary equipment.

Underlying the present invention is the recognition that the formats required, although perhaps significant in number, consist of different physical arrangements of the images that in actuality contemplate but a comparatively few rows thereof, with the number of images in said rows differing to provide the significant differences in the formats. Taking, for example, a four and a six frame format, each is laid out in the same two rows, but with two images in each row for the four-frame format and three each in the six-frame study. The aforesaid is used advantageously by selecting for image-projecting service a lens in a properly pre-selected position to provide each row of the format, and then achieving each position-location of an image in said row by successive positions of movement of said lens, all as described in detail subsequently herein. Thus, two-directional or compound movement is replaced by simple, uni-directional movement.

Broadly, it is an object of the present invention to provide an improved apparatus for photographically or otherwise producing multiple image formats overcoming the foregoing and other shortcomings of the prior art. Specifically, it is an object to achieve by pre-positioning of the image-projecting lenses, rather than by using a universally movable single lens, such parameters in the photographic record as proper image size for the selected format, as well as an appropriate positioned location therein.

An apparatus for producing multiple image formats demonstrating objects and advantages of the present invention is, as noted, of the type including an image display screen, an image-display station in a clearance position from said display screen, and having an image-projecting means in an interposed position effective to project multiple images from said display screen to said image-display station. The improvements herein contemplated are a lens support operatively arranged to partake of movement having a transverse relation to the display station and, in this way, being effective to provide selected positions correspondingly oriented transversely of the display station for the images projected thereto by the image-projecting means. On the lens support is an operative arrangement for each size of contemplated group of projected multiple images of at least two cooperating image-projecting lenses, the same being in adjacent position to each other and, in this way, being effective to project the images not only transversely of the display station but also in a delineated area or portion thereof related to the position of each image-projecting lens. Thus, one lens produces one format row, and the other the row adjacent thereto. Completing the lens support is a multiple tier construction therein for supporting the operative arrangements of image-projecting lenses for said each size of projected image at selected fixed distances from the display station which are at the proper focal lengths, i.e. working distances of each lens group to the display screen and display station, that contributes to said lens group providing the appropriate image size for the format produced by this lens group. Stated another way, use of these tiers is effective to obtain a magnification or, more properly, a minification, in the projected image into the size desired at said display station for the different formats. Thus, with optimum minimum movement in the lens support there is nevertheless obtained multiple images appropriately sized and position-located on the film substate that is suitable for the selected display format.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a simplified perspective view of a typical prior art apparatus for producing various formats of multiple image film records in which it is more particularly illustrated how the camera thereof is mounted for multiple degrees of movement to achieve positioning of the image in accordance with the format of the film record;

FIG. 2 is a perspective view illustrating the improved apparatus according to the present invention also capable of producing multiple image formats, but with significantly reduced movement in the image projecting lenses thereof;

FIG. 3 is a partial size elevational view, on an enlarged scale and in section taken along lines 3—3 of FIG. 2, showing further structural details;

FIGS. 4A, 4B and 4C are plan views illustrating three of the many different formats that might be utilized in the photographic record produced by the apparatus of either FIGS. 1 or 2.

Figure 6:
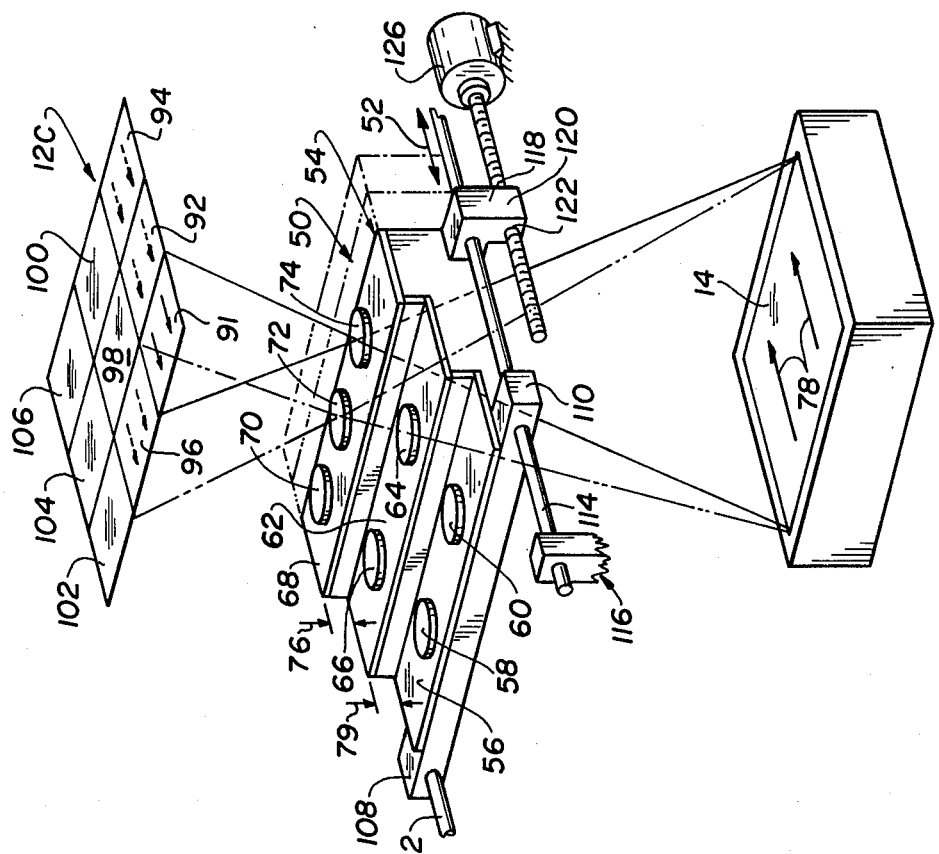
FIGS. 5 and 6 are views similar to FIG. 2 illustrating in full line and phantom perspective the positions of movement of the movable lenses thereof for producing the different multiple image formats.

There are numerous models and kinds of apparatus, such as apparatus of prior U.S. Pat. No. 4,027,315, for producing on a single sheet of film 12 a selected number of images for subsequent review, as part of a nuclear medicine dynamic study of a gamma camera, or other such purpose. As is well understood and as is illustrated in FIG. 1, the prior art apparatus 10 may typically be used to project successively displayed images from a video display screen 14 into each of four delineated areas 16, 18, 20 and 22 of the film sheet 12, thus providing a so-called four-frame format for the film sheet 12. This is achieved using a lens assembly 24 which, as illustrated in FIG. 1, is in an interposed position between the screen 14 and the film 12 and is appropriately mounted for those degrees of movement which contribute to the lens 24 projecting the image of the video screen 14 into each specific delineated area that is assigned to each image in order to produce the particular format for the multiple images that is photographically reproduced on the film sheet or substrate 12. To this end, lens assembly 24 is operatively arranged in a well understood manner so as to be urged in opposite directions 26 by corresponding opposite direction movement in the closed loop pulley belt 28 entrained about the pulleys 30 and 32 urged through movement by a cooperating motor 34. Similarly, but in opposite transverse movement 36, apparatus 10 also includes a closed loop pulley belt 38 entrained about pulleys 40 and 42 and powered by motor 44. Although not shown in FIG. 1, but also part of the well understood degrees of movement that are designed to be imparted to the lens assembly 24 in the construction of the apparatus 10, is movement along the lens focusing axis 46, and thus movement which determines the size of the projected image. In this regard, and as is well understood, the size of the projected image is related to the particular format that has been pre-selected for the film substrate 12. That is, assuming that substrate 12 is to have the four-frame format illustrated in FIG. 1, the projected image which might fill the entire display screen 14 must be appropriately minified during its projection from screen 14 to the film substrate 12 so that it is co-extensive not with the entire surface area of substrate 12, but only with one of the previously noted four smaller-sized delineated areas thereof.

Still another degree of movement that typically is embodied in the lens assembly 24 is rotative movement 48 about the axis 46, which movement will enable a prism or other such optical element of the lens assembly 24 to modify the angular orientation of the projected image to the extent of the rotatable traverse 48.

Reference should now be had to the remaining figures, and initially to FIG. 2, in which there is illustrated an apparatus, generally designated 50, which has marked and significant improvements over typical prior art apparatus for producing multiple image formats. One such significant improvement, among others, is that with a single opposite direction movement 52 in transverse relation to both the video display and film substrate, as at 14 and 12 as previously denoted, the improved apparatus 50 hereof is capable of producing any selected one of a wide range of multiple image formats. Three specific and exemplary formats are illustrated in FIGS. 4A–C and consist, respectively, of a two-frame format 12A, a four-frame format 12B, and a nine-frame format 12C. To illustrate the preferred construction and mode of operation of the apparatus 50 it will be explained in conjunction with FIGS. 2, 5 and 6 how each of the formats 12A, 12B and 12C, respectively, are produced by said apparatus.

Prior to the description of the production of a specific format, however, the improved construction in the apparatus 50 will first be noted which contributes to its simplified mode of operation, and more particularly how it achieves the production of these formats even though it uses a single degree of movement 52 as a replacement for the prior art two degrees of movement 26 and 36. More particularly, apparatus 50 includes a lens-supporting carriage, generally designated 54, which in the embodiment illustrated is constructed with three decks or tiers of different elevations with respect to the horizontal plane of the transverse movement 52 of the carriage 54. That is, carriage 54 has a lower tier 56 with which there is cooperatively associated the lens assemblies 58 and 60; an intermediate tier 62 and its cooperating lens assemblies 64 and 66; and an upper tier 68 having, in this instance, three cooperating lens assemblies 70, 72 and 74. The significance of the tier construction is that the lenses associated therewith are spaced from each other, as for example as represented by the distance 76 between the intermediate and upper tiers 62 and 68, and that consequently the operative position of the lenses of these different tiers is established at selected fixed distances from the plane of the film substrate 12. These fixed distances are carefully selected to be compatible with the focal lengths of the lens and thus to be appropriate to provide the magnification or, more accurately the minification, in the projected image that is appropriate for the selected format that is photographically reproduced on the film substrate.

Figure 5:
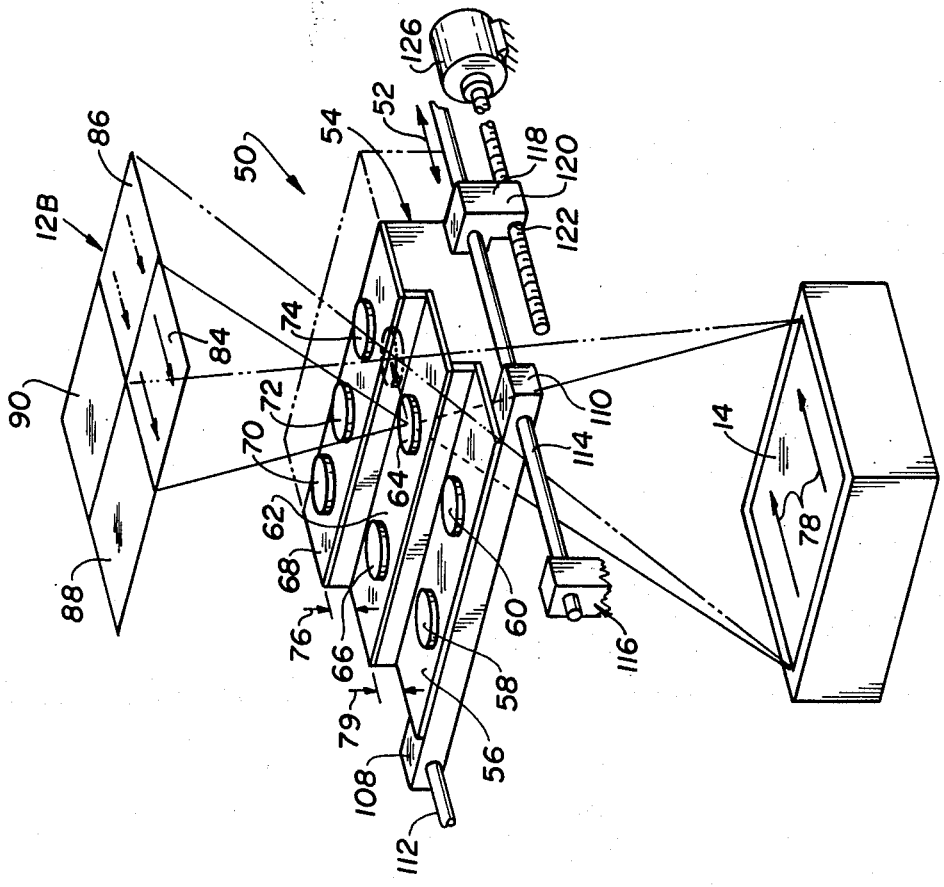

As is illustrated in the two-frame substrate 12A of FIG. 2, lenses 58, 60 of the lowermost tier 56 are utilized in the projection of the image, represented by the double arrow 78, from the display screen 14 to the area 80 delineated on the film substrate 12A for said image which, for a two-frame format is, of course, half the total area of the substrate. By way of further illustration, again confining the discussion at this time only to the size of the projected image, for the production of a four-frame film substrate 12B, as illustrated in FIG. 5 the lenses 64, 66 of the intermediate tier 62 are utilized. That is, since in the four-frame format 12B each projected image must be accommodated in one-fourth the area of the substrate or, in other words, one-half of that allotted to the image in the two-frame format 12A, the projected image must be appropriately minified. This will be understood to be achieved by the location of the lenses 62, 64 the height or distance 80 that the intermediate tier 62 is closer to the plane of the substrate 12B than the lower tier 56. Stated another way, in switching from the lenses of the lower tier 56 to the lenses of the intermediate tier 62, one achieves the equivalent of moving the prior art lens 24 the distance 80 along the focus axis 46, said distance and said direction being understood to provide the appropriate minification in the image projected for photographic reproduction on the film substrate.

It is convenient at this point in the description, and also for completeness sake, to refer to minification or appropriate reduction of the projected image in connection with the nine-frame format 12C, and thus reference should be had now to FIG. 6 which is illustrative thereof. More particularly and as illustrated in this figure, the nine-frame format 12C is produced using the lenses of the upper tier 68 which strategically locates these lenses the further previously noted distance 76 closer to the plane of the film substrate 12C. As a result of bringing the image-projecting lenses the distance 76 closer to said film substrate, the projected image is minified and each is thus accommodated in one-ninth of the total area of the substrate.

Although not shown, it will of course be understood that in a 16-frame format consisting of four rows of four images each, wherein each image is co-extensive in size with 1/16th of the total film substrate area, that a fourth tier would be added to the carriage 54 of the within improved apparatus 50. It should be readily appreciated that the additional tier would have four cooperating lens assemblies supported thereon in equally spaced locations across the width of the carriage, and that said additional tier would be at an elevated or raised height above tier 68 and thus in the direction along the focus axis 46 of the lens assemblies to provide 1/16th minification in the projected image.

In addition to providing the projected image in an appropriate size for the selected format, it is also necessary that apparatus 50 properly position the projected image on the substrate. In turning again to FIG. 2 and considering specifically the two-frame format 12A, the one projected image 78 illustrated therein is positioned-located in area 80 by the simple expedient of utilizing only lens 60 while all of the other carriage lenses are inoperative or covered, and particularly lens 58. After image 48 is photographically reproduced in area 80, the other portion or half 82 of the area readily has transmitted to it a displayed image for photographic reproduction therein by simply using lens 58, while maintaining lens 60 inoperative or covered. Naturally, lens 58 being at the same fixed distance from the plane of substrate 12A as lens 60 is effective, as already noted, in projecting an image from the display screen 14 in the appropriate size for the delineated area 82.

Referring now to FIG. 5, it should be readily appreciated that in the four-frame format 12B that only the lenses 62 and 64 are utilized since, as already noted, these lenses are at the appropriate fixed distance from the plane of the substrate to provide the appropriate size in the projected image. It will be understood that carriage 54 is in appropriate starting position which correspondingly provides a strategic position for the lens assembly 66 between the display screen 14 and substrate 12B which enables the effective transfer of image 78 to a first film area 84 of the four-frame format 12B. Next, and still again only using lens assembly 66, carriage 54 is moved from its initial position through a precise positioning movement 52 which results in the carriage 54 assuming a position of movement illustrated in phantom perspective in FIG. 5. Said movement in the carriage 54, of course, also produces a corresponding movement in the lens 66, with the result that said lens is effective in transferring the successively displayed image on the screen 14 to the next delineated area 86 of the four-frame format 12B. Following this, it will be understood that the carriage 54 is returned to its initial starting position illustrated in full line in FIG. 5. At this point, lens 66 is rendered inoperative by being covered or the like, and lens 64 is then operated for image-transferring service. As a result lens assembly 64 is effective in the full line position of the carriage 54 of projecting an image into the area 88 of the multiple image format 12B. Carriage 54 is then again moved to its position illustrated in phantom perspective permitting said lens to project an image for photographic reproduction in the final delineated area 90. In this manner, simply by appropriate selection of the one of the two lenses 64 and 66 for operation in conjunction with a simple degree of movement along carriage path 52, it is readily possible for apparatus 50 to produce a four-frame format 12B.

For completeness sake, reference should now be had to FIG. 6 which illustrates the production of the nine-frame format 12C. Since this format has three rows of three images, the carriage 54 has an initial starting position, illustrated in full line, and two successive positions of movement, illustrated in phantom perspective, along the carriage movement path 52. Thus, during this movement traverse and using only lens assembly 74, a displayed image, in sequence, is successively projected, in the appropriate size, into the delineated areas 90, 92 and 94. Carriage 54 is then returned to its starting position, and only lens 72 utilized for the image-transferring function. As illustrated in FIG. 6, lens 72 is effective in the initial or full line position of the carriage 54 in projecting image 78 into the area 96. Subsequent movement of the carriage 54 results in lens 72 effectively achieving image-transfer to the remaining two areas 98 and 100 of the second row. Following this, the carriage 54 is again returned to its initial position for a third movement traverse along path 52, this time using lens 70 to achieve image-transfer to the areas 102, 104 and 106.

As an alternative to, and even in some instances a substitution for, the production of one format row along path 52 at a time, as just described in connection with the four and nine frame formats of FIGS. 5 and 6, respectively, the movement logic of carriage 54 can be modified to produce format rows transverse thereto which minimizes the number of traverses along path 52. Thus, using as an example the nine-frame format 12C of FIG. 6, in the initial starting position of carriage 50 images 91, 96 and 102 can be produced by successive selection of lenses 74, 72 and then 70, and the carriage then moved along path 52 to its second position of movement. At said second movement position, the lenses 74, 72 and 70 would then be successively utilized to produce the format images 92, 98 and then 104. At the next carriage position, format 12C would be completed with images 94, 100 and 106. Thus, instead of three positions of movement along path 52 per row for the carriage 54, or nine positions in all for said nine-frame format, the carriage movements are reduced to three. This movement logic is therefore understandably used whenever the study depicted on the film record 12C is to be read in the sequence of the images as just noted, or is of the type where image sequence or the lack thereof is not of concern in the contemplated use of the record 12C.

From the foregoing description it should be readily appreciated that a wide range of multiple image formats can be provided by the within improved apparatus 50 hereof, even though the primary degree of movement in the movable part thereof, namely the carriage 54, is only in opposite directions along path 52. Further, the transverse movement path of the image-projecting lenses may be embodied in any one of a number of appropriate constructions, the preferred embodiment, however, being that which will now be described in particular connection with FIG. 2. Mounted to extend laterally from opposite sides of the carriage 54 are guide blocks 108 and 110 fixedly connected to horizontally oriented rods 112 and 114 which at their opposite ends are slidably disposed in upstanding supports, as exemplified by the single support at 116. Thus carriage 54 is movable in opposite directions along the movement path 52 in response to the sliding movement of the rods in their upstanding supports 116. To urge the rods 112, 114 through movement, there is fixedly connected to the rod 114 a further block 118 having depending drive nut section 120 in threaded engagement, as at 122, with drive screw 124 powered in rotation by motor 126. Thus, depending upon the direction of rotation of drive screw 124, drive nut 120 is moved a corresponding direction along the axis of the drive screw 124 and correspondingly imparts the same directional movement along the path 52 to the carriage 54, all to the end, as already described, of enabling carriage 54 to appropriately position the projected image in a designated delineated area on the film substrate.

The production of the different multiple image formats, also as already described, contemplates the appropriate selection of a single lens assembly for operation during the movement traverse 52 of the carriage 54 while the other lens assemblies remain inoperative or covered. Any number of electronic circuits for operating the lens assemblies in a desired programmed sequence can be used to provide selective lens assembly operation in the order or sequence necessary for the production of the different multiple image formats. Since electronic programming circuits are well known, a description thereof has been omitted as unnecessary, it being deemed sufficient for a complete understanding of the invention to understand, as already fully described, how the lens assemblies are selectively operated to provide the various multiple image formats.

There is illustrated in FIG. 3, however, a preferable manner of switching between the operational and non-operational conditions of the lens assembly. More particularly, it will be understood that each identically constructed lens assembly 24 has a larger diameter upper portion which advantageously provides a mounting shoulder 128 for seating the assembly 24 in place in a horizontally oriented wall 130 of the tier supporting said assembly. Disposed adjacent to the assembly is a cooperating rotary solenoid 132 which when pulsed via the conductors 134 produces a rotary uncovering movement in a cooperating lens shutter 136. When uncovered, the lens assembly 24 will be understood to provide the image-transferring function already described. Thus, to select the lens assembly that is to be operational during the carriage traversing movement 52, the solenoid 132 associated with said lens assembly is electrically pulsed, thereby moving the shutter 136 of the lens to an out-of-the-way or clearance position. Naturally, the remaining lens assemblies 24 which are to remain non-operational will continue to have their respective shutters in a covering or closed condition.

In conjunction with the operation of a shutter 136 for each cooperating lens 24 to determine the operational and non-operational conditions of the lens, good practice may also dictate on-off control of the video image 78 being displayed on the monitor screen 14. Thus, the operating cycle may contemplate that the video monitor 14 be first turned on and an image 78 displayed thereon with a required intensity and clarity, and then the movement of a selected shutter 136 to an uncovering position in relation to its cooperating lens. During termination of said lens operation, the reverse would of course be dictated, namely shut-off of the video monitor 14 prior to the closing or lens-covering movement of the shutter 136. Whether the video monitor 14 is left on continuously, or on-off supervision is exercised thereover, the shutter position will be understood in the appended claims to be the operating parameter of the within apparatus which primarily contributes to proper lens selection in accordance with the present invention.

In the preparation of multiple image formats that require a modification in the orientation or angular display of the images, any one of a number of well understood means are provided to cause rotation of the lens assembly about its focusing axis 46. Alternatively, the film substrates can be pre-positioned in an appropriate orientation suitable for the format, as described in detail in co-pending patent application Ser. No. 879,153, entitled "Improved Method Of Producing Multiple Image Formats" being filed concurrently herewith.

In the preceding description, the within inventive apparatus was related to nuclear medicine and a specific end use with a gamma camera to provide dynamic studies, but it will be understood that such description was not intended to, and should not, impose limitations on the invention. For example, even as to the specific exemplary use in providing a so-called dynamic study, it is to be understood that it can also advantageously be used for static, whole body, and physiological function gated imaging. Also, while having noteworthy utility as an accessory to a gamma camera, it will be understood that the within inventive contributions are also compatible with any diagnostic imaging instrument with a video output display. It is, in fact, within the contemplated scope of the invention that the technology thereof be used in a free standing hard copy recording instrument with a built in video display and optical system, designed for both computerized tomography for an X-ray device and ultrasound scanner applications.

The reference in the description and claims to "film" and/or "film substrate" will be understood to include not only conventional photographic materials, but also standard X-ray film and single emulsion radiographic film compatible with X-ray film processors, of 5"×7", 8"×10" or other appropriate dimensions.

The within invention is also to be understood not to be limited to any of the specific formats referred to herein, since it is also applicable to a wide range of choices of available number and sizes of images to be recorded. For example, for typical nuclear medicine dynamic studies up to 30 images in selected formats of 4, 6, 9, 12, 16, 20, 25 and 30 are the rule, but special studies are also known which require up to 64 images. Further, while there is an optimum desired correlation between image size and the number of recorded images for the selected film size, e.g. on 8"×10" X-ray film three popular choices of formats typically would be four 105 mm size images, nine 90 mm size images, or sixteen 70 mm size images, as compared with corresponding choices on 11"×14" film of four 135 mm size images, nine 105 mm size images, or sixteen 90 mm size images, this correlation between image size and number is not intended to, and should not, impose limitations on the invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. Apparatus for producing photographic records of multiple images in selected formats comprising an image display screen, an image-display station in a clearance position from said display screen, a multi-tier carriage having image-projecting lenses thereon disposed in an interposed position between said image display screen and said image-display station and operatively arranged to partake of movement having a transverse relation to said display station to provide selected positions correspondingly oriented transversely of said display station for images projected thereto by said carriage image-projecting lenses, said tiers of said carriage being at selected fixed distances from said display station effective to obtain a magnification in said projected images at said display station for the size desired for a selected format, and said image-projecting lenses of said carriage being in a cooperative arrangement of at least two in number on one said tier and on another said tier in a cooperating arrangement of at least three in number so as to be effective in producing formats of two rows of images using said two lenses and of three rows of images using said three lenses, and means operatively effective to urge said carriage through a successively displaced select number of positions in transverse relation to said image-display station to thereby contribute to providing in said formats additional rows of images transversely oriented to said other rows and in a number corresponding to said positions, whereby with optimum minimum movement of said multi-tier carriage there is nevertheless obtained multiple images appropriately sized and position-located on said photographic record suitable for the format selected for the display of said multiple images.

2. Apparatus for producing photographic records as claimed in claim 1 wherein said multi-tier carriage is comprised of at least three tiers, to thereby correspondingly provide at least three magnification sizes to said projected images.

3. Apparatus for producing photographic records as claimed in claim 2 wherein said multi-tier carriage is operatively supported for guided movement between two spaced apart guide rods oriented transversely of said image-display station.

4. Apparatus for producing photographic records as claimed in claim 3 wherein each image-projecting lens has a cooperating shutter movable between a lens-covering and an uncovering position, to thereby provide each said lens respectively with a non-operational and operational condition.

5. Apparatus for producing photographic records of multiple images in at least first, second and third formats respectively consisting of two, four and nine images in which said first format of two images is defined by two images in one row, said second format of four images is defined by two images in two rows, and said third format of nine images is defined by three images in three rows, said apparatus comprising an image display screen, an image-display station in a clearance position from said display screen, a three-tier carriage respectively having two image-projecting lenses on a first and a second tier and three lenses on said remaining third tier thereof, said carriage having an operative interposed position between said image-display screen and said image-display station and operatively arranged to partake of movement having a transverse relation to said display station to provide select positions correspondingly oriented transversely of said display station for images projected thereto by said image-projecting lenses, each of said three tiers of said carriage being at a selected fixed distance from said display station effective to obtain a magnification in said projected images at said display station for the size desired for said two, four and nine image formats, and means operatively effective to urge said carriage when providing said four and nine image formats through successively displaced two and three positions in transverse relation to said image-display station to thereby contribute to providing in said four and nine image formats two rows of two images and three rows of three images respectively, whereby with optimum minimum movement of said three-tier carriage there is obtained said two, four and nine image formats with each image appropriately sized and position-located therein.

* * * * *